(12) United States Patent
Satou

(10) Patent No.: US 10,471,792 B2
(45) Date of Patent: Nov. 12, 2019

(54) STOPPER FOR VEHICLE

(71) Applicant: BRIDGESTONE CORPORATION, Tokyo (JP)

(72) Inventor: Shunji Satou, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/556,873

(22) PCT Filed: Feb. 19, 2016

(86) PCT No.: PCT/JP2016/054940
§ 371 (c)(1),
(2) Date: Sep. 8, 2017

(87) PCT Pub. No.: WO2016/143488
PCT Pub. Date: Sep. 15, 2016

(65) Prior Publication Data
US 2018/0015799 A1    Jan. 18, 2018

(30) Foreign Application Priority Data

Mar. 12, 2015    (JP) ................... 2015-049454

(51) Int. Cl.
*B60G 7/04* (2006.01)
*B60G 11/22* (2006.01)
*F16F 1/373* (2006.01)

(52) U.S. Cl.
CPC ............... *B60G 7/04* (2013.01); *B60G 11/22* (2013.01); *F16F 1/3732* (2013.01);
(Continued)

(58) Field of Classification Search
CPC .............. F16F 9/58; F16F 1/3732; B60G 7/04
See application file for complete search history.

(56) References Cited

U.S. PATENT DOCUMENTS 2,659,595 A * 11/1953 Coda ..................... B60G 7/04
267/292
2,779,603 A     1/1957 McRae
(Continued)

FOREIGN PATENT DOCUMENTS

EP    2 930 393 A1    10/2015
JP    09-272317 A    10/1997
(Continued)

OTHER PUBLICATIONS

Machine translation of JP 9-272317, retrieved Aug. 8, 2018 (Year: 2018).*

(Continued)

*Primary Examiner* — Bradley T King
(74) *Attorney, Agent, or Firm* — Sughrue Mion, PLLC

(57) ABSTRACT

The present invention relates to a stopper (10) for vehicle which is disposed between a vehicle body side member (31) and a wheel side member (32) to restrict a relative amount of movement of both members (31, 32). The stopper includes a cylindrical holding member (11) attached to one of both members (31, 32), and an elastic body (12) which faces the other of both members (31, 32). A folded-back portion (18) bent outward in the radial direction of the holding member (11) and folded back is formed in the holding member (11).

4 Claims, 3 Drawing Sheets

(52) U.S. Cl.
CPC .. *B60G 2202/143* (2013.01); *B60G 2204/125* (2013.01); *B60G 2204/4502* (2013.01); *F16F 2232/08* (2013.01); *F16F 2236/04* (2013.01)

(56) References Cited

U.S. PATENT DOCUMENTS

| | | | | |
|---|---|---|---|---|
| 5,487,535 | A * | 1/1996 | Carter .................. | B60G 15/062 |
| | | | | 267/220 |
| 2002/0135111 | A1 * | 9/2002 | Bishop ................. | B60G 13/003 |
| | | | | 267/64.23 |
| 2006/0049604 | A1 * | 3/2006 | Okamoto .................. | F16F 9/58 |
| | | | | 280/124.116 |
| 2014/0299736 | A1 * | 10/2014 | Itou ...................... | B60G 13/003 |
| | | | | 248/611 |
| 2018/0001726 | A1 * | 1/2018 | Azpiazu Echave .. | B60G 13/001 |

FOREIGN PATENT DOCUMENTS

| | | | |
|---|---|---|---|
| JP | 2004-003591 | A | 1/2004 |
| JP | 2009-228717 | A | 10/2009 |
| JP | 2011-127703 | A | 6/2011 |
| JP | 2014-114884 | A | 6/2014 |

OTHER PUBLICATIONS

International Search Report of PCT/JP2016/054940 dated Mar. 22, 2016.
"Design of Machine Parts in Volume 3 of the Chinese Design of Machinery" edited by Pu Yan, "Design of Shapes and Structures of 5.2, Rubber Springs," p. 384, Jan. 31, 2002.
Office Action for Chinese Patent Application No. 201680014635.4 dated Sep. 23, 2019.

* cited by examiner

STOPPER FOR VEHICLE

CROSS REFERENCE TO RELATED APPLICATIONS

This application is a National Stage of International Application No. PCT/JP2016/054940 filed Feb. 19, 2016, claiming priority based on Japanese Patent Application No. 2015-049454 filed Mar. 12, 2015, the contents of all of which are incorporated herein by reference in their entirety.

TECHNICAL FIELD

The present invention relates to a stopper for a vehicle. Priority is claimed on Japanese Patent Application No. 2015-049454, filed Mar. 12, 2015, the content of which is incorporated herein by reference.

BACKGROUND ART

Conventionally, a stopper for vehicle disposed between a vehicle body side member and a wheel side member to restrict an amount of relative movement between both members is known. As this kind of stopper for vehicle, for example, there is a configuration described in the following Patent Document 1. This stopper for vehicle includes a cylindrical holding member in which one end portion in an axial direction is attached to one of the aforementioned two members, and an elastic body which is held by the holding member, protrudes toward the other side from the holding member along the axial direction, and faces the other of the two members.

PATENT DOCUMENTS

Patent Document

Patent Document 1
Japanese Unexamined Patent Application, First Publication No. 2011-127703

SUMMARY OF INVENTION

Technical Problem

However, in such a conventional stopper for vehicle, when aforementioned both members are relatively displaced in the axial direction, the elastic body is greatly compressed in the axial direction between both members, and the elastic body bulges outward in the radial direction further than the end portion on the other side of the holding member (hereinafter referred to as "the other end portion"). At this time, since the elastic body abuts against and interferes with the end edge of the holding member at the other end portion of the holding member, there is a possibility of damage to the elastic body being damaged.

The present invention has been made in view of the above circumstances, and an object thereof is to improve durability of the stopper for vehicle.

Solution to Problem

In order to solve this problem, the present invention proposes the following means. According to the present invention, there is provided a stopper for vehicle which is disposed between a vehicle body side member and a wheel side member and restricts a relative amount of movement of both members, the stopper including: a cylindrical holding member of which one end portion along an axial direction is attached to either of the two members; and an elastic body which is held by the holding member, protrudes toward the other side along the axial direction from the holding member, and faces the other of both members. In the stopper for vehicle, a folded-back portion bent outward in the radial direction of the holding member and folded back toward the one side is formed at an end portion on the other side of the holding member.

In this case, a folded-back portion is formed at an end portion on the other side (hereinafter referred to as "the other end portion") of the holding member. Therefore, in contrast to a case where the folded-back portion is not formed in the holding member, the end edge of the holding member at the other end portion of the holding member can be located to one side. Therefore, when aforementioned both members relatively displaced in the axial direction, the elastic body is greatly compressed in the axial direction between both members. When the elastic body bulges outward in the radial direction further than the end portion on the other side of the holding member, the elastic body is made to abut against the folded-back portion. Thereby, the elastic body can be prevented from abutting against the end edge of the holding member. As a result, it is possible to suppress damage to the elastic body and to improve the durability of the stopper for vehicle. Further, by forming the folded-back portion in this way, it is possible to prevent the elastic body from interfering with the end edge of the holding member. Therefore, there is also no need to suppress the deformation amount of the elastic body, for example, by increasing the volume of the elastic body in order to prevent interference between the elastic body and the end edge of the holding member. Therefore, although when the volume of the elastic body is increased, there is a possibility of the stopper for the vehicle not being suitable for the layout conditions of the interior of the vehicle or conditions such as the weight thereof, or characteristics such as the riding comfort being affected, or the cost of the stopper for the vehicle being higher, such possibilities can be prevented.

Advantageous Effects of Invention

According to the present invention, the durability of the stopper for vehicle can be improved.

DESCRIPTION OF EMBODIMENTS

Figure 1:
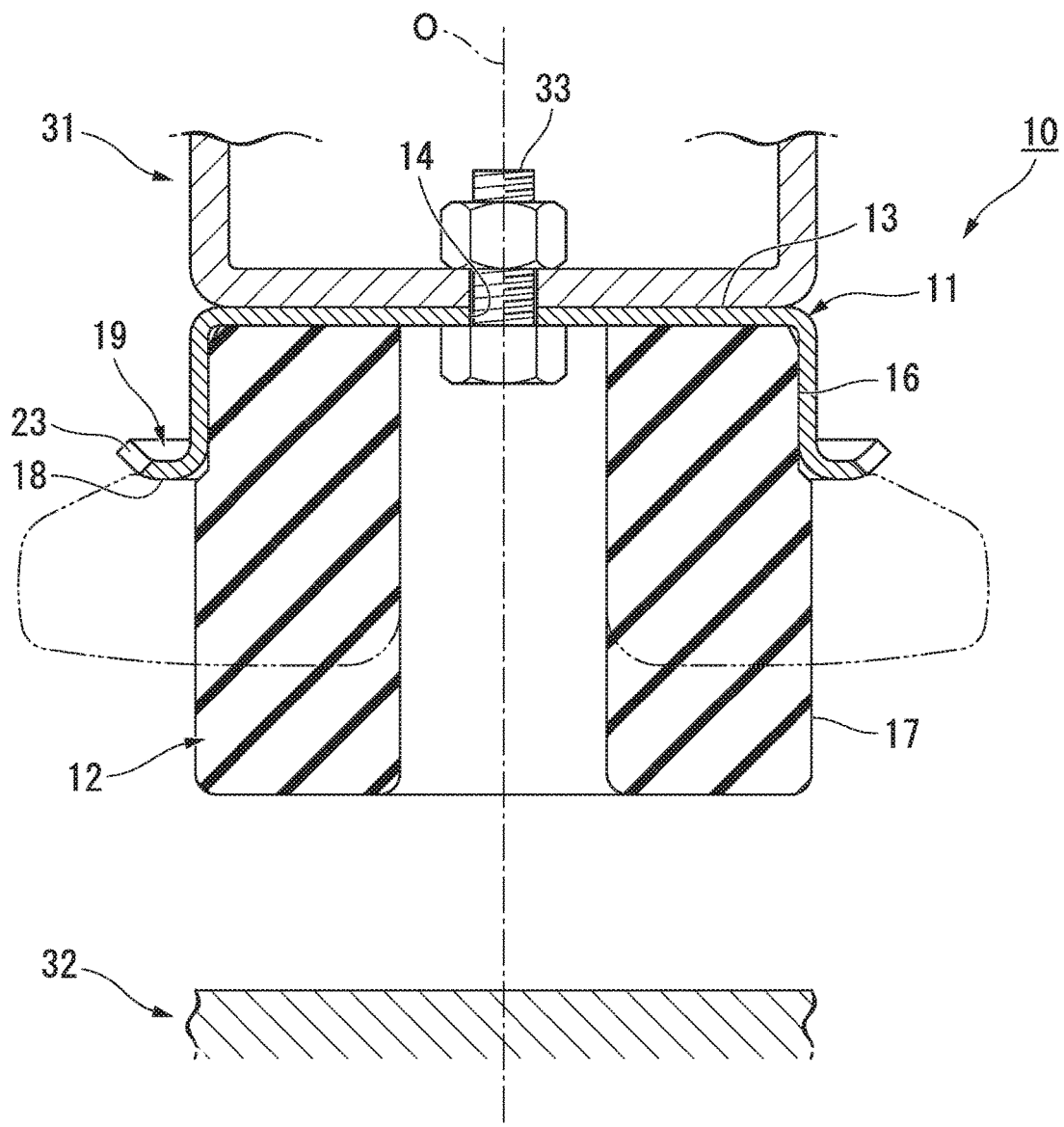
FIG. 1 is a vertical cross-sectional view of a stopper for vehicle according to the present invention.

Hereinafter, an embodiment of a stopper for vehicle according to the present invention will be described with reference to FIGS. 1 to 3. A stopper 10 for vehicle is disposed between a vehicle body side member 31 and a wheel side member 32 to restrict the relative amount of movement of both members 31 and 32. The vehicle body side member 31 is, for example, a vehicle body, and the wheel side member 32 is, for example, a frame to which the wheels are attached.

The stopper 10 for vehicle includes a cylindrical holding member 11 attached to one of the vehicle body side member 31 and the wheel side member 32, and an elastic body which is held by the holding member 11 and protrudes from the holding member 11 and faces the other of the vehicle body side member 31 and the wheel side member 32. In the example illustrated in FIG. 1, the holding member 11 is attached to a vehicle body which is the vehicle body side member 31, and the elastic body 12 is attached to a frame which is the wheel side member 32.

In the present embodiment, the elastic body 12 is formed in a cylindrical shape, and the respective central axes of the holding member 11 and the elastic body 12 are located on a common axis. Hereinafter, the common axis is referred to as an axis O, and a direction along the axis O is referred to as an axial direction (the axial direction of the holding member 11). In a plan view of the stopper 10 for vehicle viewed from the axial direction, a direction orthogonal to the axis O is referred to as a radial direction (a radial direction of the holding member 11), and a direction revolving around the axis O is referred to as a circumferential direction (a circumferential direction of the holding member 11).

The holding member 11 is formed of, for example, a metal or the like. The holding member 11 is formed in a cylindrical shape with a top in which one end portion along the axial direction is closed. Hereinafter, a side closer to a top wall portion 13 of the holding member 11 along the axial direction is referred to as one side in the axial direction, and a side opposite side thereto is referred to as the other side in the axial direction.

One end portion of the holding member 11 is attached to the vehicle body side member 31. An insertion hole 14 penetrating the top wall portion 13 in the axial direction is formed on the top wall portion 13 of the holding member 11. By inserting a bolt 33 through the insertion hole 14 from the other side and screwing the bolt 33 to the vehicle body side member 31 (vehicle body), the one end portion of the holding member 11 is attached to the vehicle body side member 31 (vehicle body). The insertion hole 14 is disposed coaxially with the axis O.

The elastic body 12 is formed of, for example, rubber, urethane or the like. The elastic body 12 protrudes from the holding member 11 toward the other side, and the other end portion of the holding member 11 faces the wheel side member 32 in the axial direction.

The inner diameter of the elastic body 12 is the same over the entire length in the axial direction, and the outer diameter of the elastic body 12 increases stepwise from the one side to the other side. The elastic body 12 includes a small-diameter portion 16 located on the one side and fitted into the holding member 11, and a large-diameter portion 17 located on the other side and protruding from the holding member 11 to the other side.

The outer diameter of the small-diameter portion 16 is smaller than the outer diameter of the large-diameter portion 17, and the length of the small-diameter portion 16 in the axial direction is smaller than the length of the large-diameter portion 17 in the axial direction. The small-diameter portion 16 may abut against the inner circumferential surface of the holding member 11 over the entire region of the outer circumferential surface of the small-diameter portion 16. In this case, when the holding member 11 is displaced in the axial direction to compress the elastic body 12, the elastic body 12 (the large-diameter portion 17) easily bulges in the radial direction.

At the end portion on the other side of the holding member 11 (hereinafter referred to as "the other end portion"), a folded-back portion 18 bent toward the outer side in the radial direction and folded back toward the one side is formed. The folded-back portion 18 is formed by folding back the other end portion of the holding member 11.

Figure 2:
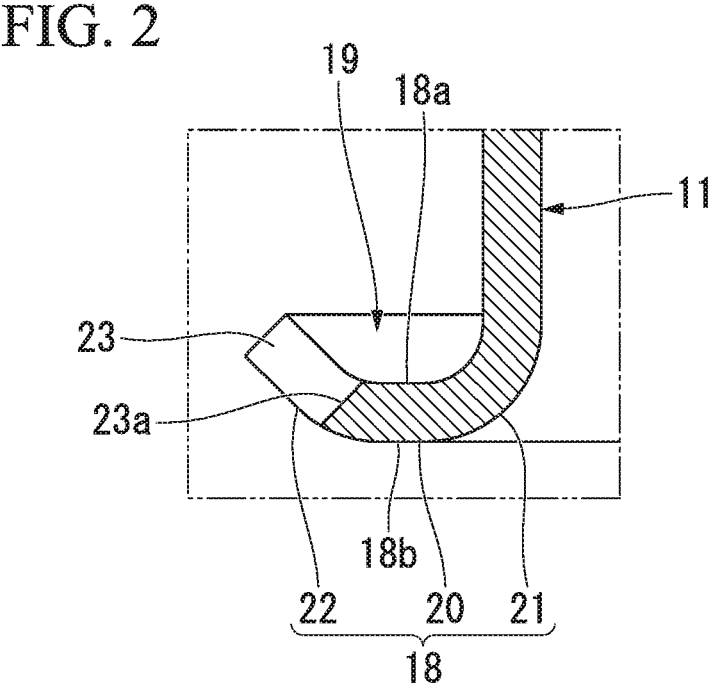
FIG. 2 is an enlarged vertical cross-sectional view of a main part of a holding member of the stopper for vehicle illustrated in FIG. 1.

As illustrated in FIG. 2, in the vertical cross-sectional view of the stopper 10 for vehicle, the folded-back portion 18 is formed in a curved shape that protrudes toward the other side. That is, in the folded-back portion 18, both of the inner surface 18a facing the one side and the outer surface 18b facing the other side are formed in a curved shape that protrudes toward the other side in the vertical cross-sectional view of the stopper 10 for vehicle. The folded-back portion 18 forms an annular concave portion 19 extending over the entire circumference in the circumferential direction. The bottom surface of the annular concave portion 19 is formed by an inner surface 18a of the folded-back portion 18.

The folded-back portion 18 includes a base portion 20 protruding outward in the radial direction from a portion (hereinafter referred to as an "adjacent portion") adjacent to the other end portion in the holding member 11, a curved portion 21 that connects a proximal end portion located on the inner side of the base portion 20 in the radial direction and the adjacent portion of the holding member 11, and an inverted portion 22 that protrudes to the one side from a protruding end portion located on the outer side of the base portion 20 in the radial direction.

The base portion 20 is formed in an annular shape in which a front surface and a back surface facing the axial direction extend in a direction orthogonal to the axis O. The curved portion 21 gradually extends toward the other side outward in the radial direction, and is formed in a curved shape that protrudes toward the other side in the vertical cross-sectional view of the stopper 10 for vehicle. The inverted portion 22 gradually extends outward in the radial direction toward the one side.

Figure 3:
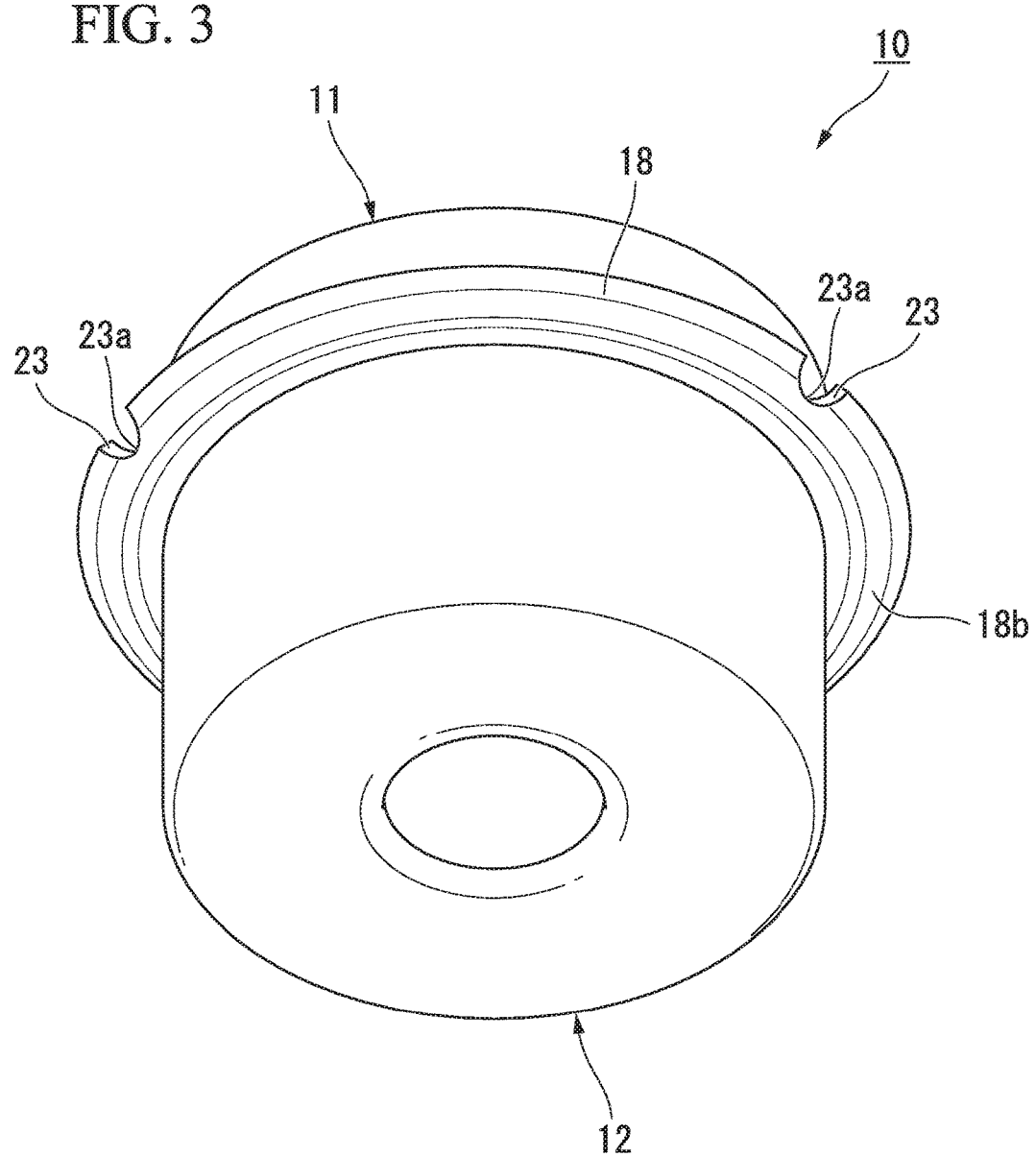
FIG. 3 is a perspective view of the stopper for vehicle illustrated in FIG. 1.

As illustrated in FIGS. 2 and 3, a drainage hole 23 penetrating the folded-back portion 18 in its thickness direction is formed in the folded-back portion 18, and drainage holes 23 are formed at intervals in the circumferential direction. The drainage holes 23 are formed in the inverted portion 22 of the folded-back portion 18, and penetrate the folded-back portion 18 (inverted portion 22) in the axial direction. The drainage holes 23 are formed in a notch shape which opens outward in the radial direction. The drainage holes 23 gradually reduce in size in the circumferential direction from the outer side toward the inner side in the radial direction. The drainage holes 23 are formed in a semicircular shape that protrudes inward in the radial direction in a plan view seen from the axial direction.

As illustrated in FIG. 2, at least a portion of the drainage hole 23 are located in the portion located closest to the other side of the inner surface 18a of the folded-back portion 18, and are formed at the deepest portion (bottom surface) of the annular concave portion 19. In the example illustrated in FIG. 2, the drainage holes 23 are formed over the entire length in the radial direction of the inverted portion 22, and an inner portion 23a of the inner circumferential surface of the drainage hole 23 located on the inner side in the radial direction and facing the outer side in the radial direction is located in a portion in which the inverted portion 22 and the base portion 20 are connected to each other on the inner surface 18a of the folded-back portion 18.

The inner portion 23a of the inner circumferential surface of the drainage hole 23 gradually extends outward in the radial direction from the one side toward the other side, and is inclined with respect to the axis O in the vertical cross-sectional view of the stopper 10 for vehicle. Thus, the portion of the inner surface 18a of the folded-back portion 18 located at the radially innermost side of the circumferential edge portion of the opening of the drainage hole 23 is located on the inner side in the radial direction of a portion of the outer surface 18b of the folded-back portion 18 located at the radially innermost side of the circumferential edge portion of the opening of the drainage hole 23.

As described above, according to the stopper 10 for vehicle of the present embodiment, the folded-back portion 18 is formed at the other end portion of the holding member 11. Therefore, the end edge of the holding member 11 at the other end portion of the holding member 11 can be located on the one side, as compared with a case where the folded-back portion 18 is not formed on the holding member 11. Therefore, when aforementioned both members 31 and 32 are relatively displaced in the axial direction, the elastic body 12 is greatly compressed in the axial direction between both members 31 and 32. As indicated by the alternate dashed-two dotted line in FIG. 1, when the elastic body 12 bulges to the outer side in the radial direction further than the end portion on the other side of the holding member 11, the elastic body 12 is made to abut against the folded-back portion 18. Thereby, it is possible to prevent the elastic body 12 from abutting against the end edge of the holding member 11. As a result, it is possible to suppress damage to the elastic body 12 and to improve the durability of the stopper 10 for vehicle. Further, by forming the folded-back portion 18 in this way, it is possible to suppress the elastic body 12 from interfering with the end edge of the holding member 11. Therefore, it is not necessary to suppress the deformation amount of the elastic body 12, for example, by increasing the volume of the elastic body 12 in order to suppress the interference between the elastic body 12 and the end edge of the holding member 11. Therefore, though when increasing the volume of the elastic body 12, there are possibilities in which the stopper for the vehicle may not be suitable for the layout condition of the internal space of the vehicle or conditions such as weight, the characteristics such as riding comfort may be affected, or the cost of the stopper for vehicle may increase, such possibilities can be prevented.

Further, according to the stopper 10 for vehicle of the present embodiment, the drainage hole 23 is formed in the folded-back portion 18. Therefore, even if a liquid such as water accumulates on the folded-back portion 18, the liquid can be discharged through the drainage hole 23. This makes it possible to suppress the deterioration of the folded-back portion 18 due to the accumulation of liquid on the folded-back portion 18, and to further improve the corrosion resistance of the holding member 11.

Further, according to the stopper 10 for vehicle of the present embodiment, the inner portion 23a of the inner circumferential surface of the drainage hole 23 gradually extends outward in the radial direction from the one side toward the other side in the axial direction. Therefore, in the state in which the stopper 10 for vehicle is disposed so that the one side in the axial direction faces the side vertically above and the other side in the axial direction faces the side vertically below, the drainage performance of the drainage hole 23 is secured, and in the folded-back portion 18, the circumferential edge portion of the opening of the drainage hole 23 on the outer surface 18b facing the other side can be relatively easily located on the outer side in the radial direction. Therefore, when the elastic body 12 bulges outward in the radial direction, the elastic body 12 can be prevented from being damaged by abutting against the circumferential edge portion of the opening of the drainage hole 23 on the outer surface 18b of the folded-back portion 18.

Further, according to the stopper 10 for vehicle of the present embodiment, the drainage hole 23 is formed in the inverted portion 22 of the folded-back portion 18, and the inner portion 23a of the inner circumferential surface of the drainage hole 23 gradually extends outward in the radial direction from the one side toward the other side in the axial direction. Therefore, in a state in which the stopper 10 for vehicle is disposed so that the one side in the axial direction faces the vertically upper side and the other side in the axial direction faces the vertically lower side, in the opening portion of the drainage hole 23, the opening portion formed on the inner surface 18a facing the one side in the folded-back portion 18 can be easily located relatively vertically downward on the inner surface 18a of the folded-back portion 18, and the liquid on the folded-back portion 18 can be effectively discharged.

Further, according to the stopper 10 for vehicle of the present embodiment, at least a part of the drainage hole 23 is located in a portion of the inner surface 18a of the folded-back portion 18 located closest to the other side. Therefore, in a state in which the stopper 10 for vehicle is disposed so that the one side in the axial direction faces the vertically upper side and the other side in the axial direction faces the vertically lower side, it is possible to effectively discharge the liquid accumulated on the folded-back portion 18.

The technical scope of the present invention is not limited to the aforementioned embodiment, and various modifications can be made within the scope that does not depart from the spirit of the present invention.

Instead of forming the drainage hole 23 over the entire length of the inverted portion 22 in the radial direction, for example, the drainage holes 23 may be formed only in the radially outer end portion of the inverted portion 22, and the drainage holes 23 may be formed in the base portion 20. Further, instead of forming the drainage hole 23 in a notched shape which opens outward in the radial direction, for example, the drainage hole 23 may be disposed inside the folded-back portion 18 and may be formed in a shape which does not open in any direction in the radial direction. Further, instead of gradually extending the inner portion 23a of the inner circumferential surface of the drainage hole 23 outward in the radial direction from the one side toward the other side, for example, the inner portion 23a of the inner circumferential surface of the drainage hole 23 may be formed in a straight line shape extending parallel to the axial direction. Also, drainage holes 23 may not be provided. In addition, the folded-back portion 18 may be formed to have a shape folded back to the one side to a greater extent than in the present embodiment, and for example, the folded-back portion 18 may be formed to have a shape in which it abuts against the outer circumferential surface of the adjacent portion of the holding member 11. Further, the holding member 11 may be attached to the wheel side member 32, and the elastic body 12 may be attached to the vehicle body side member 31.

Furthermore, the constituent elements in the above-described embodiment can be appropriately replaced with well-known constituent elements within the scope that does not depart from the spirit of the present invention, and the above-described modified examples may be appropriately combined.

INDUSTRIAL APPLICABILITY

According to the present invention, durability of the stopper for vehicle can be improved.

REFERENCE SIGNS LIST

10 Stopper for vehicle
11 holding member
12 Elastic body
18 Folded-back portion
18a Inner surface
18b Outer surface
22 Inverted portion
23 Drainage hole
23a Inner portion
31 Body side member
32 Wheel side member

The invention claimed is:

1. A stopper for vehicle which is disposed between a vehicle body side member and a wheel side member to restrict a relative amount of movement of the vehicle body side member and the wheel side member, the stopper for vehicle comprising:
   a cylindrical holding member including a first end portion on one side in a vertical direction, and a second end portion on the other side in the vertical direction, the first end portion attached to one of the vehicle body side member and the wheel side member and disposed above the second end portion in the vertical direction; and
   an elastic body which is held by the holding member, protrudes toward the other side in the vertical direction from the holding member, and faces the other of the vehicle body side member and the wheel side member,
   wherein a folded-back portion, which is bent outward in a radial direction of the holding member and folded back toward the one side in the vertical direction, is formed at the second end portion of the holding member,
   wherein the folded-back portion comprises:
   a curved portion gradually extending toward the other side in the vertical direction and outward in the radial direction from an adjacent portion of the holding member adjacent to the folded-back portion,
   a base portion extending outward in the radial direction from the curved portion, and
   an inverted portion gradually extending toward the one side in the vertical direction and outward in the radial direction from the base portion, and
   wherein a drainage hole penetrating the folded-back portion is formed in the inverted portion thereof, and
   wherein the elastic body is configured to expand in the radial direction while contacting the folded back portion.

2. The stopper for vehicle according to claim 1, wherein the drainage hole penetrates the folded-back portion in the vertical direction, and
   an inner portion of an inner circumferential surface of the drainage hole located inside in the radial direction and facing outward in the radial direction gradually extends outward in the radial direction from the one side toward the other side in the vertical direction.

3. The stopper for vehicle according to claim 1, wherein at least a part of the drainage hole is located in a portion located to be closest to the other side in the vertical direction, of an inner surface facing the one side in the vertical direction, of the folded-back portion.

4. A stopper for vehicle which is disposed between a vehicle body side member and a wheel side member to restrict a relative amount of movement of the vehicle body side member and the wheel side member, the stopper for vehicle comprising:
   a cylindrical holding member including a first end portion on one side in a vertical direction, and a second end portion on the other side in the vertical direction, the first end portion attached to one of the vehicle body side member and the wheel side member and disposed above the second end portion in the vertical direction; and
   an elastic body which is held by the holding member, protrudes toward the other side in the vertical direction from the holding member, and faces the other of the vehicle body side member and the wheel side member,
   wherein a folded-back portion, which is bent outward in a radial direction of the holding member and folded back toward the one side in the vertical direction, is formed at the second end portion of the holding member,
   wherein the folded-back portion comprises:
   a curved portion gradually extending toward the other side in the vertical direction and outward in the radial direction from an adjacent portion of the holding member adjacent to the folded-back portion,
   a flat base portion extending outward in the radial direction from the curved portion, and
   an inverted portion gradually extending toward the one side in the vertical direction and outward in the radial direction from the base portion, and
   wherein a drainage hole penetrating the folded-back portion is formed in the inverted portion thereof.

* * * * *